Feb. 23, 1954
G. C. JOYCE
2,670,147
BOBBIN WINDING MACHINE
Filed Dec. 8, 1951
7 Sheets-Sheet 1
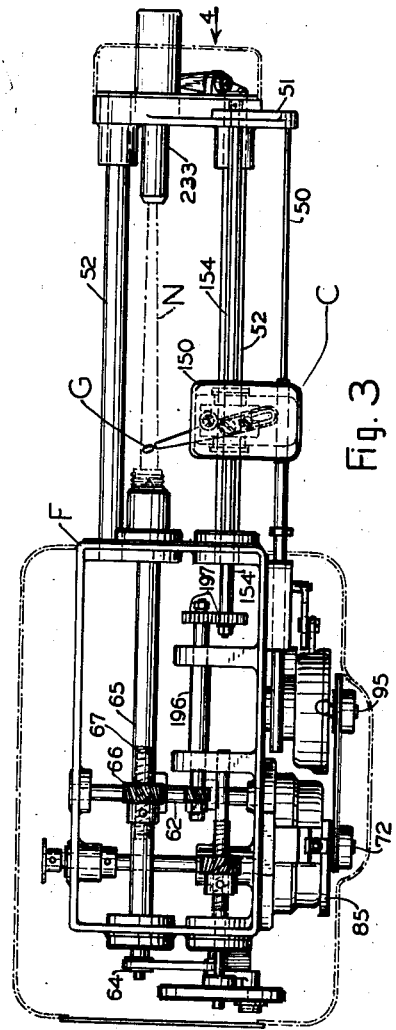
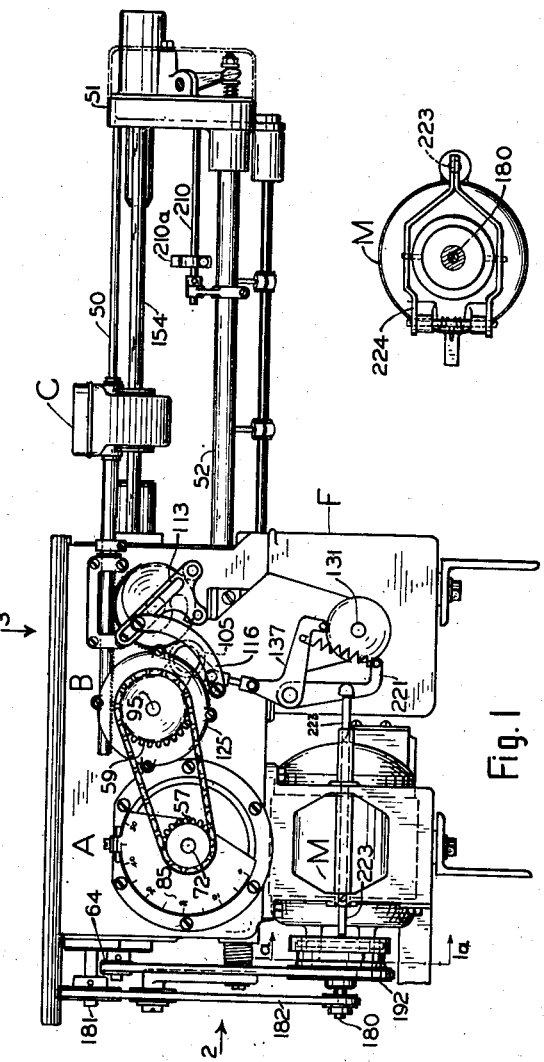
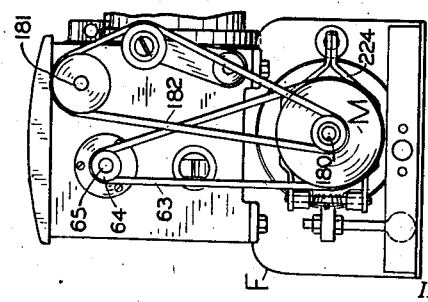
INVENTOR.
GLOVER C. JOYCE.
BY
Chas. T. Hawley
ATT'Y.

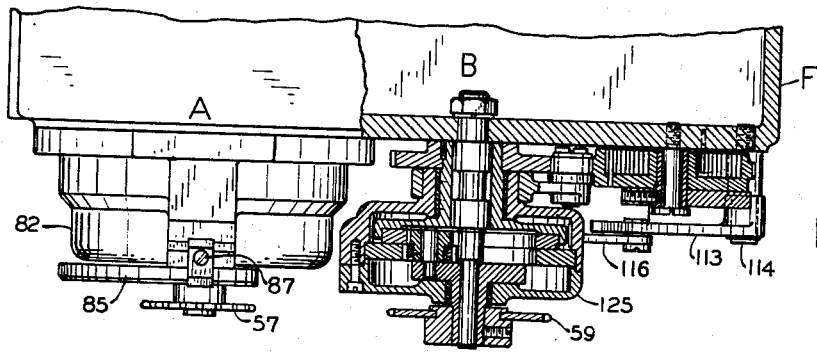
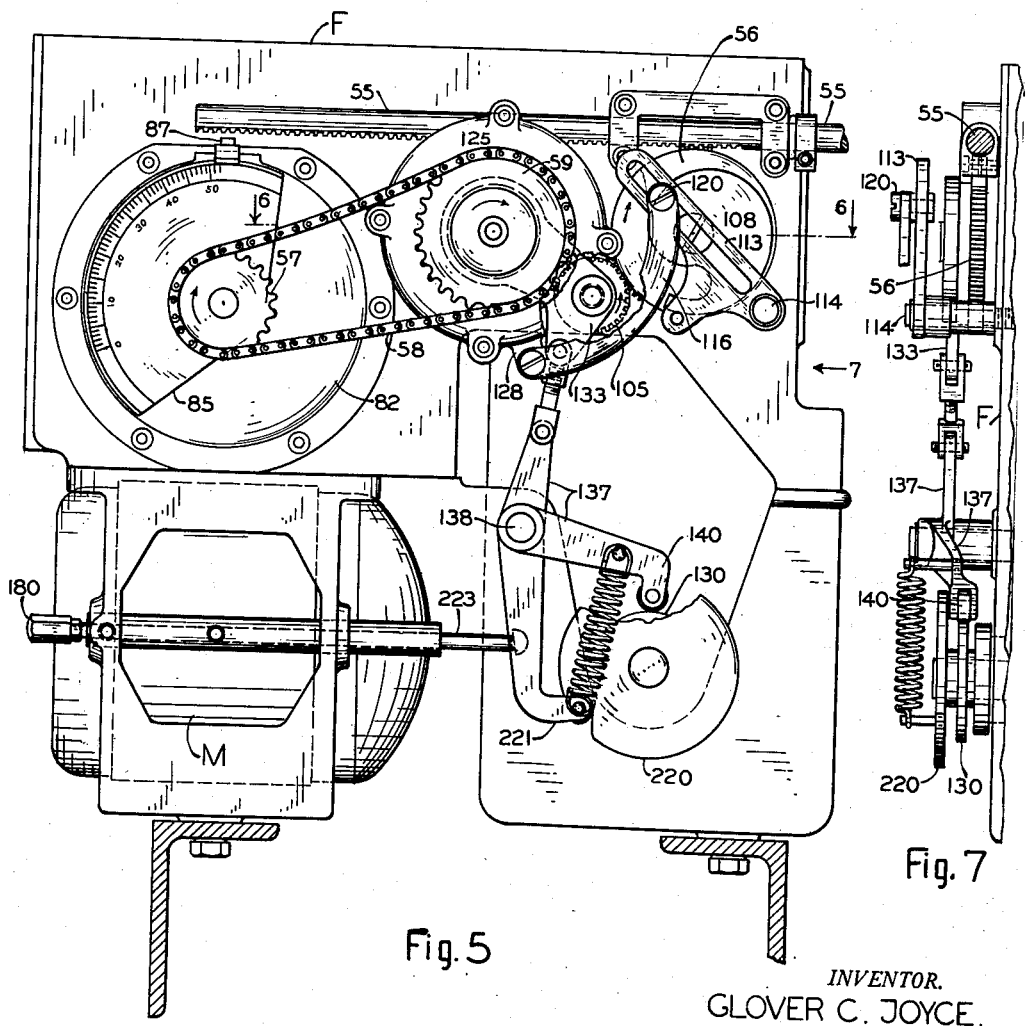

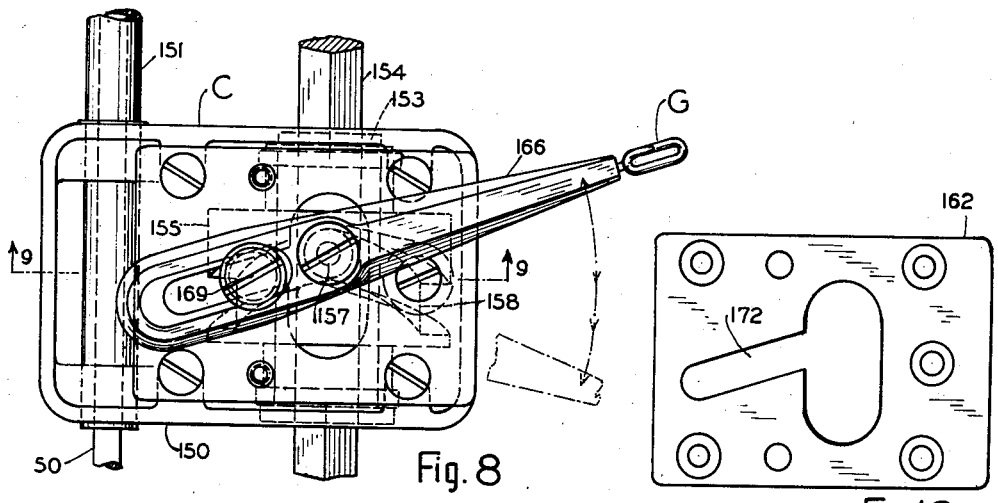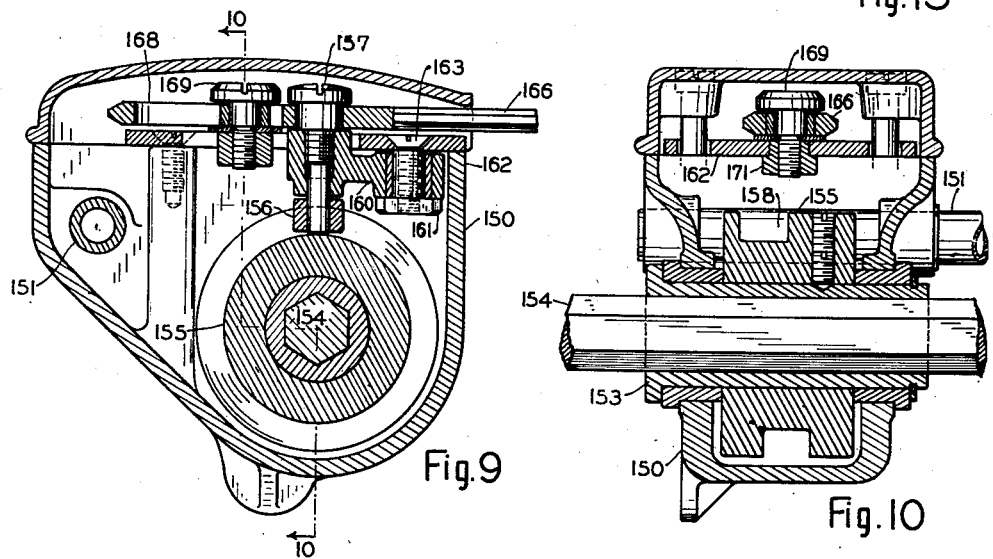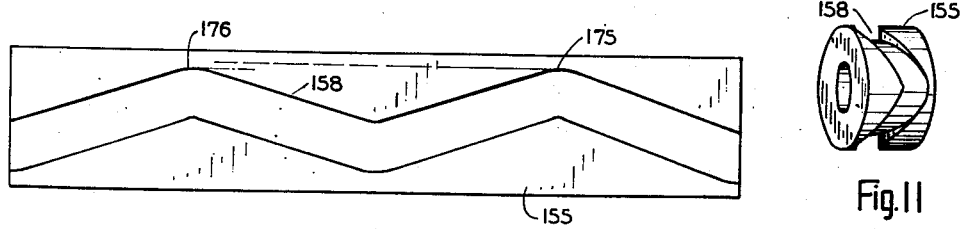

Feb. 23, 1954
G. C. JOYCE
2,670,147
BOBBIN WINDING MACHINE
Filed Dec. 8, 1951
7 Sheets-Sheet 4
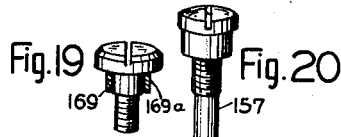
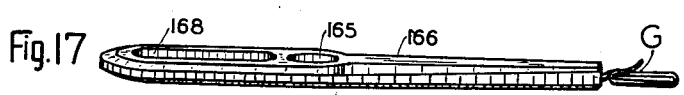
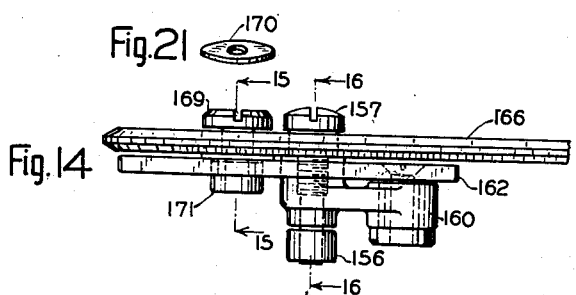
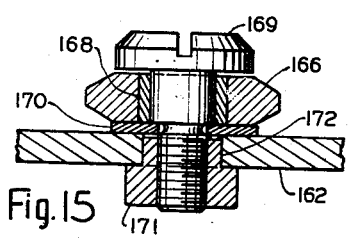
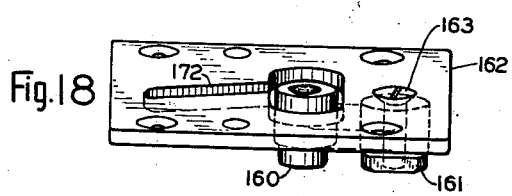
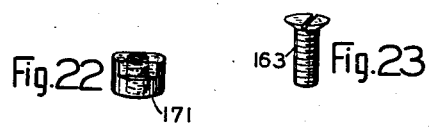
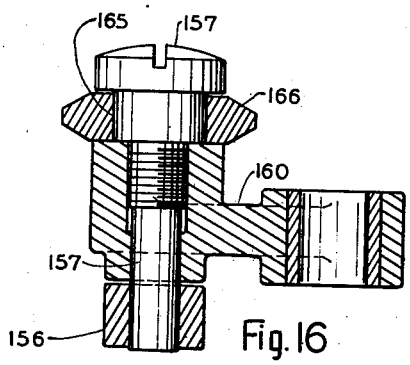
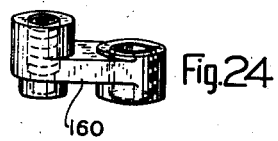
INVENTOR.
GLOVER C. JOYCE.
BY
Chas. T. Hawley
ATTY.

Feb. 23, 1954

G. C. JOYCE 2,670,147

BOBBIN WINDING MACHINE

Filed Dec. 8, 1951

INVENTOR.
GLOVER C. JOYCE.
BY
Chas. T. Hawley
ATT'Y.

Feb. 23, 1954 G. C. JOYCE 2,670,147
BOBBIN WINDING MACHINE
Filed Dec. 8, 1951 7 Sheets-Sheet 6
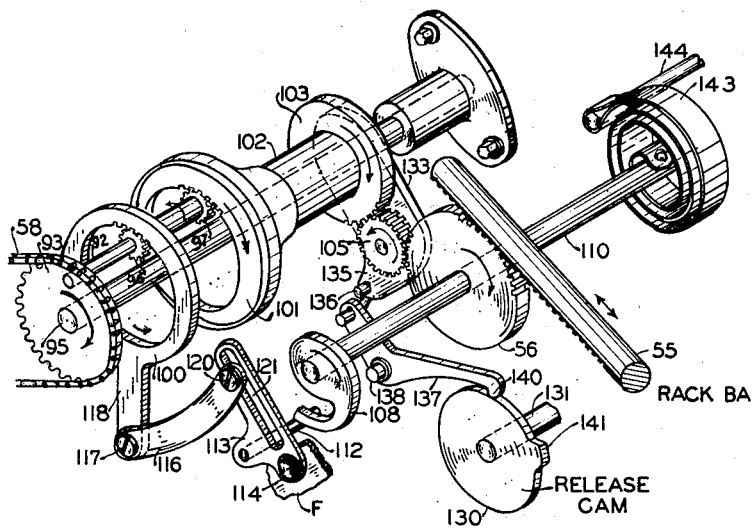
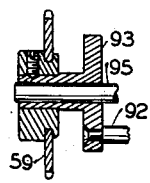
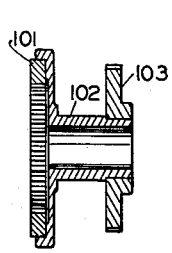
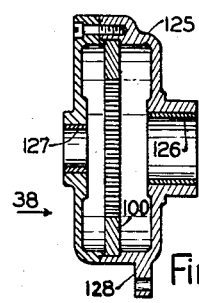
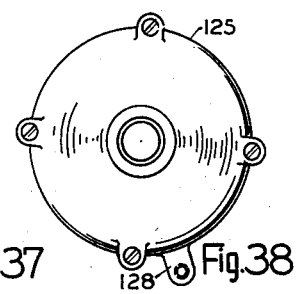
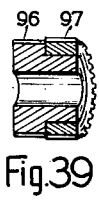
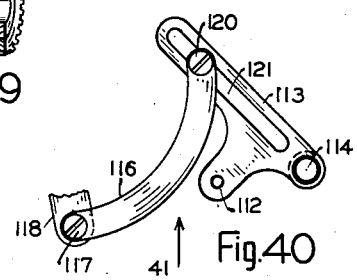
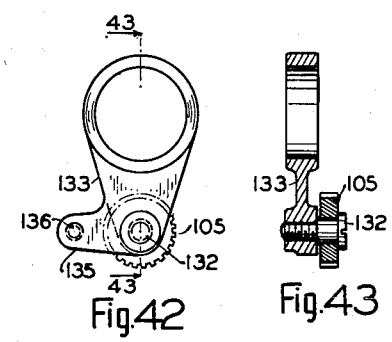
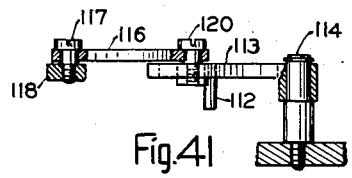
INVENTOR.
GLOVER C. JOYCE.
BY
Chas. T. Hawley
ATTY.

Patented Feb. 23, 1954

2,670,147

UNITED STATES PATENT OFFICE 2,670,147

BOBBIN WINDING MACHINE

Glover C. Joyce, Worcester, Mass., assignor to Whitin Machine Works, Whitinsville, Mass., a corporation of Massachusetts Application December 8, 1951, Serial No. 260,719

8 Claims. (Cl. 242—27)

This invention relates to a machine for winding thread or yarn on bobbins, and particularly for winding weft or filling yarn on loom bobbins. Such bobbins are commonly tapered and one important object of my invention is to provide improved mechanism for winding a cylindrical yarn package on a tapered bobbin.

Another object is to provide means for easily adjusting and adapting the winding machine to operate on bobbins of different sizes and tapers.

Other features of the invention relate to the provision of an improved thread guide carriage and high-speed operating means therefor; to the provision of improved means for variably feeding the thread guide carriage as the winding progresses; and to the provision of improved stopping and resetting mechanism which is automatically rendered operative when the winding of a bobbin is completed. The entire design of the machine is also particularly adapted to very high speed operation and with correspondingly increased production.

My invention further relates to certain arrangements and combinations of parts which will be hereinafter described and more particularly set forth in the appended claims.

A preferred form of the invention is shown in the drawings, in which

Fig. 1 is a front elevation of a preferred embodiment of the invention;

Fig. 1a is a detail sectional end view, taken along the line 1a—1a in Fig. 1;

Fig. 2 is an end view, looking in the direction of the arrow 2 in Fig. 1;

Fig. 3 is a plan view, looking in the direction of the arrow 3 in Fig. 1;

Fig. 4 is an end view, looking in the direction of the arrow 4 in Fig. 3 and having a portion of the casing removed;

Fig. 5 is an enlarged front elevation of certain parts shown in Fig. 1;

Fig. 6 is a plan view of the mechanism shown in Fig. 5 and partly in section substantially along the line 6—6 in Fig. 5;

Fig. 7 is a partial end elevation, looking in the direction of the arrow 7 in Fig. 5;

Fig. 8 is a plan view of a thread guide carriage;

Fig. 9 is a sectional side elevation taken along the line 9—9 in Fig. 8;

Fig. 10 is a transverse sectional elevation, taken along the line 10—10 in Fig. 9;

Fig. 11 is a perspective view of an operating cam;

Fig. 12 is a development of said cam;

Fig. 13 is a plan view of a guide plate to be described;

Fig. 14 is a side elevation of an assembly of thread guide parts;

Fig. 15 is an enlarged sectional elevation, taken along the line 15—15 in Fig. 14;

Fig. 16 is a similar elevation, taken along the line 16—16 in Fig. 14;

Fig. 17 is a perspective view of a thread guide lever;

Fig. 18 is a perspective view of a guide plate and certain associated parts;

Figure 27:
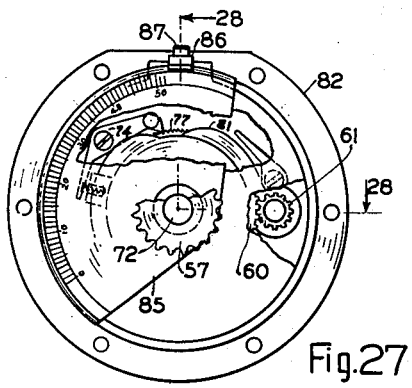
Figure 28:
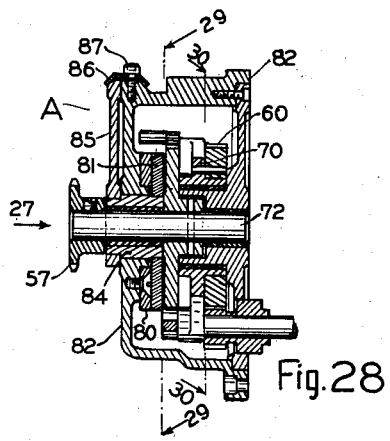
Figure 29:
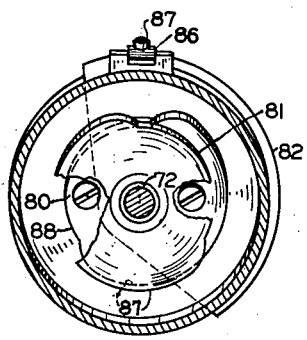
Figure 30:
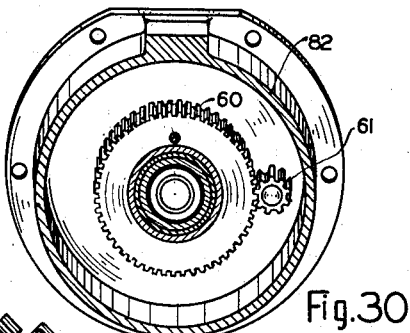
Figure 33:
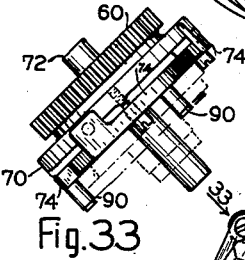
Figure 32:
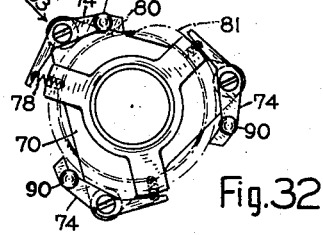
Figure 31:
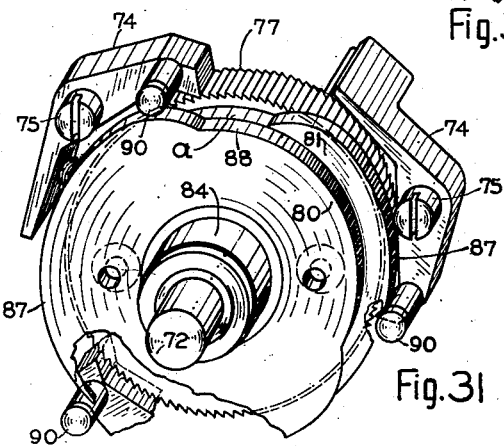
Figure 44:
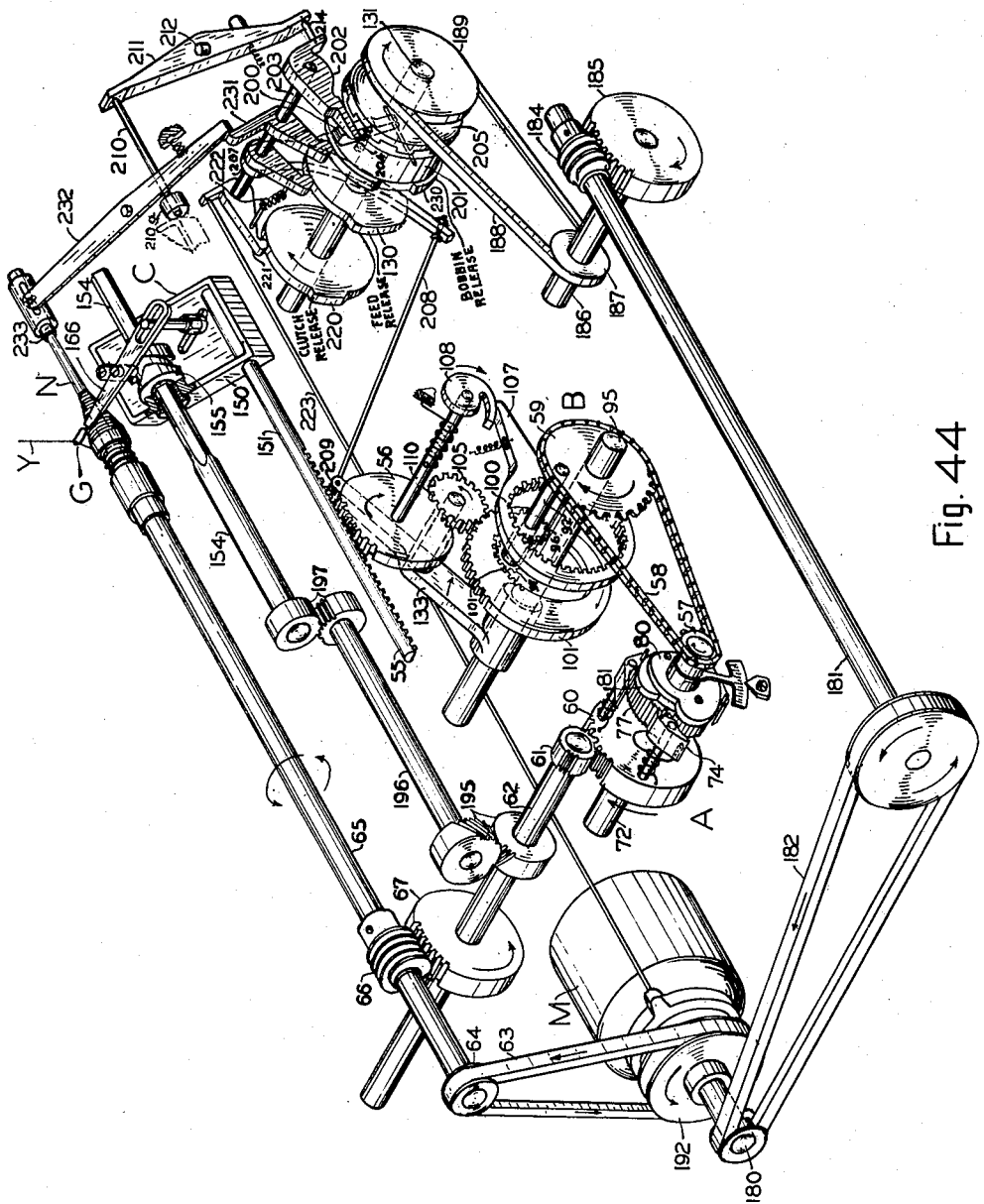

Figs. 19–26 inclusive are perspective views of detailed parts to be described;

Fig. 27 is a front elevation of a pick mechanism;

Fig. 28 is an irregular sectional view, taken along the line 28—28 in Fig. 27;

Figs. 29 and 30 are front elevations of certain parts in partial perspective and looking in the directions of the arrows 29 and 30 respectively in Fig. 28;

Fig. 31 is a perspective view of certain actuating parts of the pick mechanism;

Fig. 32 is a front view of certain parts shown in Fig. 31;

Fig. 33 is an oblique plan view of certain parts looking in the direction of the arrow 33 in Fig. 32;

Fig. 34 is an exploded perspective view of certain feed-control mechanism;

Figs. 35 to 43 are detailed views, partly in section, of certain parts shown in Fig. 34 and to be hereinafter described; and Fig. 44 is a diagrammatic perspective view, showing the driving relation of the several component units or mechanisms.

The winding machine herein shown is adapted for winding bobbins of different diameters, lengths and tapers, and the windings may be of varied outside diameters.

An assembly of the machine in a preferred form is shown in Figs. 1 to 4. The machine as shown comprises a driving motor M, a pick unit A, a compensating and control unit B, and a thread guide carriage and control mechanism C. The units A and B and the motor M have a casing or frame F, and the thread guide carriage is slidable on a rod 50, secured to an end frame member 51 which, in turn, is secured to supporting rods 52 (Fig. 3) which are fixed in the frame F.

Briefly stated, the contour and diameter of the thread package is determined by the rate of feed of the thread guide carriage, and this feed is dependent upon the setting of the pick unit A and upon the operation of the compensating and control unit B.

The thread guide carriage is fed lengthwise of the bobbin N (Fig. 44) by a rack rod 55, which is moved lengthwise by a gear 56. This gear 56 is intermittently advanced in small increments by the pick unit A through a sprocket 57, chain 58, sprocket 59, and intervening mechanism comprising the compensating and control unit B.

A gear 60 (Fig. 44) is rotated by a pinion 61 on a shaft 62 driven from the motor M through a belt 63, pulley 64, spindle shaft 65, worm 66 and worm gear 67. The gear 60 is thus continuously rotated by the motor M but at greatly reduced speed during each full winding operation.

Pick unit

The gear 60 is secured to a rotating member or spider 70 (Figs. 28 to 33), and the spider 70 rotates freely about the axis of a stud 72, which stud supports the sprocket 57. A plurality of pawls 74 (Fig. 31) are pivoted on studs 75 fixed in the spider 70, and each pawl 74 is moved to engage a ratchet wheel 77 by an associated spring 78 (Fig. 32).

The extent of engagement of each pawl with the ratchet wheel 77 is determined by a pair of coacting cam plates 80 and 81 mounted concentric with the stud 72. The outer cam plate 80 is fixed to the casing 82 (Fig. 28) of the pick unit A, and the inner cam plate 81 is mounted on a loose bushing 84 (Fig. 28) to which is secured an index plate 85 (Figs. 1 and 27). Each cam plate 80 and 81 comprises a larger concentric portion or rise 87 (Figs. 29 and 31) and a smaller concentric portion 88.

The cam plate 80, as above stated, is fixed to the casing 82, and the cam plate 81 may be angularly adjusted by manual movement of the index plate 85. When thus adjusted, the plate 85 may be secured by a clamping plate 86 (Fig. 28) and a clamping screw 87.

Each pawl 74 has a stud or roll 90 (Fig. 31) projecting therefrom and engaging the peripheries of both cam plates 80 and 81. When the stud 90 is supported by the larger portion or rise 87 of either cam plate, the associated pawl 74 is inoperative, but when the roll 90 drops into the space between the rises 87 (which space is indicated at $a$ in Fig. 31) the associated pawl 74 will engage and feed the ratchet wheel 77. The number of teeth fed on such engagement depends on the angularly adjusted position of the movable cam plate 81.

Consequently, the rate of feed of the ratchet wheel 77 is determined by the setting of the cam plate 81 and may be varied from one tooth to a substantial angular movement, according to the adjusted setting.

The pawl-supporting member or spider 70 rotates continuously, as previously explained, and at each rotation three successive pawls 74 engage and feed the ratchet wheel as their studs 90 successively enter the reduced space $a$ between the rises 87 of the cam plates 80 and 81. By increasing the space $a$ to its greatest limit, the feed of the ratchet wheel may be made substantially continuous, whereas by greatly reducing the space $a$, the feed of each pawl may be limited to a single tooth, with a net advance of three teeth for each revolution of the member 70.

Compensating and control unit

The compensating and control mechanism B (Fig. 44) is inserted between the sprocket 59 (which is intermittently and regularly advanced by the pick unit A) and the rack bar 55 which determines the axial feed of the thread guide carriage in the assembly C.

The main object of the compensating and control mechanism in the unit B is to provide a variable and very great speed reduction between the rotation of the ratchet wheel 59, driven by the pick unit, and the rotation of the gear 56 which actuates the rack bar 55. The construction and operation of the unit B is shown in exploded perspective in Fig. 34 and in detail in Figs. 35 to 43.

A stud 92 is mounted in the side of a disc 93 (Fig. 35) and is moved in a circular path by the sprocket 59, the disc 93 being loose on the fixed shaft 95. The stud 92 loosely supports a pair of pinions 96 and 97 (Fig. 39) which are fixed to rotate together and which commonly differ from each other by a single tooth, the pinion 97 having one more tooth than the pinion 96. The pinion 96 engages an internal gear 100 (Fig. 34) which is normally fixed. The pinion 97 engages a similar internal gear 101 on a bushing 102 (Fig. 36) and to which bushing a gear 103 is also secured. The bushing 102 rotates freely about the axis of the fixed shaft 95 and the gear 103 is connected by an idle or intermediate gear 105 to the gear 56, previously described as actuating the rack bar 55.

On each rotation of the disc 93 by the sprocket 59, the pinion 96 will be carried around inside of the fixed gear 100 for individual rotation thereby, and the pinion 97 will be correspondingly rotated but will relatively advance the gear 101 by one tooth space thereof, by reason of the extra tooth in the pinion 97.

Hence, for each rotation of the sprocket 59 and disc 93, the gear 101 advances one tooth space thereof. The disc 93 must thus perform a plurality of revolutions (perhaps 50 or more) to advance the gear 101 a single revolution.

Compensation for bobbin taper

In the usual operation of the winding machine, the barrels of the bobbins are tapered, but it is desired that the outer surface of the yarn package shall be cylindrical, so that a maximum amount of yarn may be placed on a bobbin within the width limit established by the shuttle cavity.

Special compensating mechanism is accordingly provided by which the rate of feed of the rack bar 55 may be decreased as the diameter of the bobbin grows less, with the result that the slower axial feed of the thread guide carriage will increase the amount of yarn wound on the bobbin and thus offset the decrease in bobbin diameter.

For this purpose, the gear 100 is mounted for limited angular movement and is shown diagrammatically in Fig. 44 as being provided with an arm 107 engaged by a cam 108 on the shaft 110 which supports the gear 56 and rotates therewith. As the gear 56 rotates and effects the carriage feed, the cam 108 is correspondingly rotated and allows the arm 107 to move counter-clockwise, which has the effect of bodily moving the gear 101 similarly counter-clockwise. This to some extent offsets the regular feed by the pick unit A and slows down the travel of the thread guide carriage.

By varying the contour of the cam 108, the machine may be adapted to provide a cylindrical winding on bobbins of varied size and taper, and by changing the cams the utility of the machine may be increased.

In the modified construction shown in Fig. 34, provision is made for proportionately varying the effect of each cam 108. In this construction the cam 108, instead of directly actuating the internal gear 100, engages a pin 112 in a lever 113 pivoted at 114. A link 116 is connected at one end to a stud 117 in an arm 118 fixed to the gear 100 and corresponding to the arm 107 previously described. The other end of the link 116 is pivoted on a stud 120 which is adjustable in a radial slot 121 on the arm 113. By varying the position of the stud 120 in the slot 121, the effect of the cam 108 may be substantially increased or decreased as desired for bobbins of different taper. The drag of the unit C tends to hold the pin 112 pressed against the cam 108.

A convenient practical construction for mounting and angularly adjusting the normally fixed internal gear 100 is shown in Figs. 37 and 38. The gear 100 is fixed in a closed casing 125 provided with bushings 126 and 127 on which it is supported for angular adjustment. A short arm 128 corresponds to the arm 118 shown in Figs. 34 and 40 and previously described. The operation and effect is identical.

*Return movement of the thread guide carriage*

Provision is made for prompt return movement of the thread guide carriage at the end of each winding operation. For this purpose, a cam 130 (Fig. 34) on a cam shaft 131 is given a single revolution by knock-off mechanism to be described and as each bobbin winding is completed.

The intermediate gear 105 (Figs. 42 and 43) is mounted on a stud 132 at the end of an arm 133 mounted to swing about the axis of the shaft 95. An offset portion 135 of the arm 133 has a stud 136 which extends through a slot in a bell crank lever 137 (Fig. 34) mounted on a fixed pivot 138. The free end 140 of the bell crank lever 137 engages the cam 130, which is mainly circular but which has a raised portion 141. When the raised portion 141 engages the free end 140 of the bell crank, the arm 133 will be swung on the axis of the shaft 95 and the intermediate gear 105 will be thus disengaged from the gear 56 on the shaft 110 which shifts the rack bar 55. The shaft 110 (Fig. 34) also supports the feed control cam 108.

A clock spring 143 is secured at one end to the shaft 110 and at its opposite end to a fixed rod 144. As soon as the intermediate gear 105 is moved downward to clear the gear 56, the spring 143 promptly rotates the shaft 110 anti-clockwise to reset the cam 108 and to return the rack bar 55 to initial position.

*Thread guide carriage*

The construction of the thread guide carriage is shown in Figs. 8 to 26. The carriage comprises a casing 150 (Figs. 8 and 9) mounted at the tubular end 151 of the rack bar 55 and slidable therewith on the supporting rod 50 previously described. The casing 150 has a transversely extending bushing 153 (Fig. 10) having a hexagonal opening therethrough to receive a hexagonal driving shaft 154.

A cam 155 (Figs. 10 and 11) having a double-throw peripheral cam groove 158 is mounted on the bushing 153 and is thus rotated with the hexagonal shaft 154. A roll 156 is mounted on the lower end of a stud 157 (Figs. 9 and 20) and is received in the peripheral cam groove 158. The stud 157 is mounted in one end of an arm 160 (Fig. 24) which is pivoted on a headed bushing 161 (Fig. 26) which is secured to a plate 162 by a binding screw 163 (Fig. 23). The plate 162 is fixed in the carriage casing 150.

The upper end of the stud 157 is received in a bearing opening 165 (Fig. 17) in a lever 166 having a thread guide G mounted in one end thereof. The lever 166 also has an elongated slot 168 to receive a stud 169 (Fig. 19) which also extends through a washer 170 (Fig. 21) and which is threaded in a nut 171 (Fig. 22) the upper portion of which is slidable in a slot 172 (Figs. 13 and 18) in the plate 162 previously described. The stud 169 is preferably provided with a loose bushing or roll 169ª (Fig. 19). The nut 171 is slabbed off at one end as shown in Fig. 22 so that it may slide freely in the slot 172 but cannot rotate therein.

The stud 169 constitutes a normally fixed pivot for the thread guide lever 166, but the stud 169 may be adjusted longitudinally of the slot 172 to change the position of the pivot and thus vary the throw of the thread guide G. As the slot 172 is aligned with the starting position of the thread guide G (which is shown in full lines in Fig. 8) the thread guide G will always return to this position, regardless of the adjustment of the pivot stud 169. Consequently all variations in length of throw of the thread guide take place at the opposite end of the stroke or at the end toward the tip of the bobbin.

The cam groove 158 in the cam 155 is shown developed in Fig. 12, where it will be noted that the two rises of the cam groove indicated at points 175 and 176 are at slightly different elevations. The effect of this is to slightly shift successive windings axially relative to each other, so that an improved locking of the windings is thereby attained. The threads of each winding lay between the threads in the next adjacent winding.

With the thread guide carriage and associated mechanism C constructed as above described, the thread guide G can be very rapidly oscillated by the hexagonal driving shaft 154 in every longitudinal position of the carriage, and the throw of the thread guide G may be adjusted within wide limits by changing the setting of the stud 169. Furthermore, in every position of the stud as previously described, the starting position of the thread guide G will be the full line position shown in Fig. 8.

*Driving mechanism*

The assembled driving mechanism is shown diagrammatically in Fig. 44 and in its actual relationship in Figs. 1 to 4.

Referring to Fig. 44, the motor M has an armature shaft 180 which continuously rotates a small pulley which drives a countershaft 181 through a belt 182. The shaft 181 has a worm 184 engaging a worm wheel 185 on a short shaft 186. A small pulley 187 on the shaft 186 is connected by a belt 188 to a larger pulley 189 loose on the cam shaft 131 previously described. The pulley 189 is thus rotated continuously by the motor M, but at substantially reduced speed.

The belt 63 previously described is driven by a pulley 192 loose on the armature shaft 180 but adapted to be clutched thereto by control devices to be described. The shafts 62 and 65 are thus rotated only during the winding operation.

The shaft 62 controls the longitudinal movement of the rack bar 55 and the associated yarn guide carriage through the pick unit A and compensating unit B previously described. The shaft 62 is also connected through spiral gears 195—195, shaft 196 and spur gears 197—197 to the hexagonal shaft 154 which drives the double-throw cam 155 to oscillate the thread guide lever 166 and thread guide G.

The cam shaft 131 is normally stationary and is held from rotation by a lever 200 mounted in a collar or drum 201 fixed to the shaft 131 and normally held from movement by a bell crank lever 202 pivoted on a fixed shaft 203. A notched disc 205 is normally rotated continuously with the pulley 189. Whenever the bell crank 202 is moved to release the latch 200, the latch will be swung outward by a spring 204 and will be engaged in one of the notches in the disc 205.

Such engagement causes the latch 200 and its supporting drum 201 on the shaft 131 to perform a single revolution, on the completion of which the bell crank 202 forces the latch 200 away from the notched disc and the shaft 131 returns to rest.

During this single revolution, the cam 130 on the shaft 131 operates through suitable connections (shown digrammatically in Fig. 44 at 207, 208 and 209) on the arm 133 (Fig. 42) and disengages the intermediate gear 105, thus stopping the feed and allowing return movement of the rack bar 55 and the thread guide carriage. The connections 207, 208 and 209 are shown only diagrammatically in Fig. 44 and are in correct proportion in Figs. 34 and 40.

Disengagement of the stopping bell crank 202 from the latch 200 is effected by the operation of a push rod 210 (Fig. 44) having a collar 210ª which is engaged by the thread guide carriage as it reaches its desired limit of travel. The collar 210ª is adjustable to vary the travel.

The rod 210, when thus engaged, swings a lever 211 on its pivot 212. The opposite end of the lever 211 has a link 214 which is connected to a depending arm of the bell crank 202, thus releasing the latch 200.

As the cam shaft 131 makes its single revolution, a cam 220 releases a bell crank 221 for operation by a spring 222 to shift a push rod 223 to release the motor clutch and to apply a brake 224 (Fig. 1ª) to the driving pulley 192. This promptly stops rotation of the bobbin-driving shaft 65, as well as the operations of the pick unit A and the compensating unit B.

A third cam 230 (Fig. 44) on the cam shaft 131 operates a lever 231 to shift a second lever 232 to withdraw the tail carrier 233 which normally supports the tip of the bobbin N. The bobbin then drops out of the winding machine and may be replaced by hand, or by suitable loading mechanism, not shown herein.

Operation

The operation and advantages of my improved winding machine will be readily apparent from the foregoing detailed description. Assuming that a fresh bobbin has been associated with the driving spindle 65 (Fig. 3), the motor M will then rotate the spindle and bobbin at a very high speed which may reach 12,000 revolutions a minute, and the thread guide G will be rapidly oscillated in the thread guide carriage to lay the thread or yarn in successive layers on the bobbin. The movement of the thread guide is effected by the hexagonal driving shaft 154.

At the same time, the pick unit A gradually feeds the thread guide carriage to the right in Fig. 3 (or toward the tip of the bobbin), and the rate of feed is varied and controlled by the cam 108 (Fig. 34) in the compensating unit B.

When the winding of the bobbin is completed, the thread guide carriage engages a collar 210ª (Fig. 1) and through suitable connections moves the latch 202 (Fig. 44) to release the cam shaft 131 for a single revolution.

During this single revolution, the cam 130 releases the thread guide carriage feed, so that the carriage can return to its initial or left hand position as viewed in Figs. 3 and 44; the cam 220 disconnects and brakes the driving pulley 192; and the cam 230 withdraws the tail center or bobbin support 233 from the tip of the bobbin, thus allowing the bobbin to fall out of the winding machine.

A fresh bobbin is then inserted, either manually or automatically, and the described cycle of events is then repeated. The entire machine is particularly designed for high speed operation, and the output of the machine is correspondingly large.

The quick-traverse mechanism herein shown is not claimed in this application but forms the subject matter of a divisional application Serial No. 307,327, filed August 30, 1952.

Having thus described my invention and the advantages thereof, I do not wish to be limited to the details herein disclosed otherwise than as set forth in the claims but what I claim is:

1. A bobbin winding machine comprising a winding spindle, means to rotate said spindle, a thread guide, a thread guide carriage, means to oscillate said guide in said carriage, means to shift said carriage progressively toward the tip of the bobbin being wound, additional automatic mechanical means to vary the rate of progressive shifting of said carriage as the winding proceeds, and automatic means to stop the winding operation at the end of a predetermined extent of carriage shift.

2. The combination in a bobbin winding machine as set forth in claim 1 in which the shift-varying means includes a continuously rotating cam and a coacting member effective to vary the rate of shift.

3. The combination in a bobbin winding machine as set forth in claim 1 in which the shift-varying means includes a cam and a coacting member effective to vary the rate of shift and in which adjustable leverage devices are provided between said member and said carriage effective to proportionately vary the action of said cam.

4. The combination in a bobbin winding machine as set forth in claim 1 in which the shifting means includes a connected pair of separate and slightly unequal pinions which are swept together around a circular path, a normally fixed internal gear and a movably mounted internal gear respectively engaged by said separate pinions, whereby said movable gear receives a differential rotary motion, and means to impress a limited angular movement on the normally fixed gear.

5. The combination in a bobbin winding machine as set forth in claim 4 in which the normally fixed internal gear is supported in a casing which encloses both internal gears and both pinions, and in which the limited angular movement of the normally fixed gear is imparted thereto by angularly shifting the enclosing casing.

6. In a bobbin winding machine, a thread guide, a thread guide carriage, and means to shift said carriage progressively toward the tip of the bobbin to be wound, and said shifting means including a ratchet wheel, a pawl, a support therefor rotating about the axis of said ratchet wheel, a fixed cam having concentric high and low portions, a second cam mounted concentric with said first cam and similarly contoured, and contact means associated with said pawl and holding said pawl inoperative except when said contact means is out of contact with the high portions of both cams.

7. The combination of a bobbin winding machine as set forth in claim 6 in which the second cam is mounted for manual angular adjustment about the common axis of said cams to vary the peripheral extent of the low space between the high portions of the two cams.

8. In a bobbin winding machine, a thread guide, a thread guide carriage, and means to shift said carriage progressively toward the tip of the bobbin to be wound, and said shifting means including a ratchet wheel, a plurality of pawls, a support therefor rotating about the axis of said ratchet wheel, a fixed cam having concentric high and low portions, a second cam mounted concentric with said first cam and similarly contoured, and contact means associated with each pawl and holding said pawl inoperative except when said contact means is out of contact with the high portions of both cams.

GLOVER C. JOYCE.

References Cited in the file of this patent

UNITED STATES PATENTS

| Number | Name | Date |
|---|---|---|
| 458,927 | Whyte | Sept. 1, 1891 |
| 494,723 | Rosskothen | Apr. 4, 1893 |
| 976,698 | Ryon | Nov. 22, 1910 |
| 1,214,742 | Altemus | Feb. 6, 1917 |
| 1,236,906 | Calkins | Aug. 14, 1917 |
| 2,011,429 | Walton et al. | Aug. 13, 1935 |
| 2,267,899 | Dersen | Dec. 3, 1941 |
| 2,609,156 | Kimpton | Sept. 2, 1952 |

FOREIGN PATENTS

| Number | Country | Date |
|---|---|---|
| 481,232 | Great Britain | Mar. 8, 1938 |
| 900,111 | France | Sept. 18, 1944 |